(12) United States Patent
Rivin et al.

(10) Patent No.: US 6,718,286 B2
(45) Date of Patent: Apr. 6, 2004

(54) NON-INTRUSIVE APPLICATION CODE PROFILING METHOD AND APPARATUS

(75) Inventors: Russell L. Rivin, Holliston, MA (US); Lori A. Bellavance, North Attleboro, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 09/832,529

(22) Filed: Apr. 11, 2001

(65) Prior Publication Data

US 2002/0002442 A1 Jan. 3, 2002

Related U.S. Application Data

(60) Provisional application No. 60/196,192, filed on Apr. 11, 2000.

(51) Int. Cl.[7] .................................................. G06F 11/30
(52) U.S. Cl. ...................... 702/186; 717/128; 717/127; 717/131
(58) Field of Search ......................... 702/186; 717/127, 717/128, 131, 154

(56) References Cited

U.S. PATENT DOCUMENTS

| | | | |
|---|---|---|---|
| 5,355,487 A | 10/1994 | Keller et al. ................ | 717/127 |
| 5,978,902 A | 11/1999 | Mann .......................... | 712/227 |
| 6,009,270 A | 12/1999 | Mann .......................... | 717/128 |
| 6,041,406 A | 3/2000 | Mann .......................... | 712/227 |
| 6,094,729 A | 7/2000 | Mann .......................... | 714/25 |
| 6,142,683 A | 11/2000 | Madduri ..................... | 717/128 |
| 6,148,381 A | 11/2000 | Jotwani ...................... | 711/158 |
| 6,154,856 A | 11/2000 | Madduri et al. ............. | 714/27 |
| 6,154,857 A | 11/2000 | Mann .......................... | 714/30 |
| 6,167,536 A | 12/2000 | Mann .......................... | 714/45 |
| 6,185,732 B1 | 2/2001 | Mann et al. ................. | 717/128 |
| 6,189,140 B1 | 2/2001 | Madduri ..................... | 717/128 |
| 6,314,530 B1 | 11/2001 | Mann .......................... | 714/38 |

OTHER PUBLICATIONS

PCT International Search Report (mailed Nov. 20, 2001).

*Primary Examiner*—John Barlow
*Assistant Examiner*—Anthony T Dougherty
(74) *Attorney, Agent, or Firm*—Wolf, Greenfield & Sacks, P.C.

(57) ABSTRACT

System and method for monitoring a processor when it executes software code for a computer program. A register collects information regarding instructions executed by the processor, from the program counter; and a sampler, operatively connected to the register, asynchronously from the operation of the processor, samples contents of the register. The sampler may provide the samples to a host computer via a shift register in a JTAG port, and the host computer may provide a statistical record of the instructions executed by the processor.

32 Claims, 2 Drawing Sheets

| Operation \ Cycle # | 0 | 1 | 2 | 3 | 4 | 5 | 6 | 7 | 8 |
|---|---|---|---|---|---|---|---|---|---|
| Fetch (42) | A | B | C | D | E | F | A | B | C |
| Decode (44) | – | A | B | C | D | E | F | A | B |
| "Execute" (46) | – | – | A | B | C | D | E* | F* | A |
| Register 16 (48) | – | – | A | B | C | D | D | D | A |

\* = Aborted

FIG. 2

NON-INTRUSIVE APPLICATION CODE PROFILING METHOD AND APPARATUS

This application claims the benefit of provisional application No. 60/196,192 filed Apr. 11, 2000.

FIELD OF THE INVENTION

This invention relates to the field of analysis of computer program code executing on a processor. In particular, the invention relates to non-intrusive monitoring and profiling of the time occupied by a processor executing various instructions and portions of programs, particularly application programs.

BACKGROUND OF THE INVENTION

Processors, particularly microprocessors, are widely used today in a vast variety of applications to perform information processing applications. One area, in particular, in which processors today proliferate and perform a central function is in digital signal processor (DSP) systems. In such systems, data representing physical signals such as voice or video signals or medical telemetry or instrumentation input are digitized and then subjected to various algorithms to extract information or to create new information or new signals, or to transmit information. There is an ever present market pressure to improve the operation of such DSP-based systems, to make them faster, less expensive, etc. The achievement of increased speed not only results in a focus on hardware improvements, but also on achieving a more efficient utilization of processor hardware. Consequently, one step in the process of developing application software (computer programs) to run on digital signal processors or, indeed, processors in general, is to attempt to evaluate the efficiency with which the system is operated by the software, to determine what parts of the program consume the most processing time such that the improvement thereof is most likely to improve significantly the performance of the system.

Methods commonly used to collect performance data on processor execution of program code generally have an effect on the system under test. For example, they may require the insertion of breakpoint instructions in the program code at various points so that the progress of a program may be measured from breakpoint to breakpoint. Stated another way, the conventional approach requires the program compiler and assembler (via user-installed directives) to add instrumentation code (breakpoint instructions) at all entry and exit points of subroutines. This additional instrumentation code can be used to capture the current count of the processor's program counter on subroutine more generally, (process entry). On exit, it would update a record with various information about the subroutine's (process') operation (for example, the number of times the subroutine (process) has been entered, the total time spent in the subroutine, the maximum single time in a pass through the subroutine, the minimum single time in a pass through the subroutine, and so forth). Using this information, the user can reach some conclusions as to which routines (processes) are consuming the most time on the processor and, thus, identify subroutines whose improvement is most likely to yield significant overall improvements in program performance. Of course, one drawback is that the "target" program code has to be modified, which means the system performance running the instrumented code is different from its performance running the uninstrumented code. However, altering the code and the natural flow of the program under test inherently results in production of inaccurate data since the program analyzed is not the actual program as it will exist in normal usage. Some of the dynamics of the production version of the system may be lost. As a result, particularly on systems that are carefully adjusted for best performance (i.e., typically referred to as "highly tuned"), the resulting inaccuracy can result in incorrect reports as to the parts of the system that need additional tuning.

Additionally, some of these systems strive for near 100% processor utilization. In such situations, the insertion of additional instructions into the program code to collect performance data, actually can make the system non-functional.

Accordingly, a need exists for a method and apparatus which provide non-invasive monitoring of a processor as it executes program code, without requiring that program code to be altered (e.g., additional instructions added).

SUMMARY OF THE INVENTION

The foregoing needs are addressed, and advantages obtained, by the use of a statistical profiling method which non-intrusively samples the processor's program counter in a random manner. The collected data allows a system developer to analyze (even visualize) each routine's utilization of processor time, so the developer can identify which routines are consuming the majority of the processor's performance and optimize those routines. The random sampling is obtained by taking advantage of a shift register commonly provided on processors, particularly DSPs, that have an industry-standard port known as a JTAG port. JTAG ports conventionally are provided for use in so-called boundary scanning operations.

If the sampling is not performed with random timing relative to the times at which the program counter contents change (i.e., timing independent of the processor core clock), the information collected could inaccurately show certain program counts or routines executing more or less often than actually is the case. This may occur when the sampling is somehow synchronized with the program execution. To avoid this, a system according to the invention typically uses, at least, a clock which is independent of the processor core clock to effect the sampling of the program counter contents.

To provide a greater assurance of randomness, two different methods may be employed to effectuate random sampling. First, the clock used for the register in the sampling port operates independently from the clock that operates the processor, as described in the preceding paragraph.. Second, an external host computer (e.g., a personal computer or workstation) is used to signal the sampling port as to when to sample program counter. The signal from the host is established asynchronously from the clock in the sampling port. This process adds random delays between the command to sample and the initiation of sampling. The command to effect sampling may specify or persist for a defined interval and then cease for another interval, allowing multiple successive samples and giving a "bursty" quality to the sampling process, if desired. Or only one sample may be taken at a time.

According to a first aspect, the invention involves a system for monitoring a processor when it executes software code for a computer program. The system includes a register, operatively connected to the processor, that collects information regarding instructions executed by the processor; and a sampler, operatively connected to the register, that asynchronously from the operation of the processor, samples contents of the register. The system may include a host computer receiving said samples and providing a statistical record of the instructions executed by the processor.

According to a second aspect, the invention involves a system for monitoring a processor when it executes software code for a computer program, and includes: a register, operatively connected to the processor, that collects information regarding instructions executed by the processor; a sampler, operatively connected to the register, that asynchronously from the operation of the processor, samples contents of the register; and a host computer that issues commands to initiate operation of the sampler to sample the contents of the register. The host computer may receive said samples and provide a statistical record of the instructions executed by the processor.

According to a third aspect, the invention involves a system for monitoring a processor when it executes software code for a computer program, the processor being clocked by a first clock and including a program counter also clocked by said first clock, comprising: a register operatively connected to the program counter and clocked by the first clock and receiving the contents of the program counter synchronously with the first clock except when disabled; and a latch operatively connected to the register to sample the register contents in response to a second clock which is independent of the first clock. There may also be provided logic adapted to disable the register while it is being sampled by the latch. A shift register may be included, operatively connected to receive the contents of the latch and communicate them to a user device. There may also be included a host computer clocked by a third clock which is independent of the first clock and the second clock; and an interface unit coupled between the host computer and the latch and arranged to communicate sampling commands from the host computer to the latch to initiate sampling by the latch. The interface unit may issue to the latch commands to sample synchronously with the second clock. The latch may be controlled at times to receive in sequence from the register a series of processor instruction contents from the program counter. Preferably, but optionally, there also may be included logic which disables the register when conditions for execution of an instruction in the program counter have not been satisfied.

According to yet another aspect, the invention involves a method for monitoring a processor when it executes software code for a computer program, the processor being clocked by a first clock and including a program counter also clocked by said first clock, comprising: capturing the instruction contents of the program counter in a register, non-invasively, synchronously with the first clock, except not capturing the instruction contents for instructions which will not be executed; and sampling the register contents in response to a second clock which is independent of the first clock. Such a method may further include disabling the register while it is being sampled. Sampling may include delivering the program counter contents to a shift register operatively connected to receive the contents of the latch and communicate them to a user device. Preferably, the shift register is in a JTAG port. The user device can be a host computer and the host computer can be operated to generate a statistical analysis of the captured program counter instruction contents. Optionally, the method may further include clocking the host computer by a third clock which is independent of the first clock and the second clock; and using an interface unit coupled between the host computer and the latch, communicating sampling commands from the host computer to the latch to initiate sampling by the latch.

The method also may include the interface unit issuing to the latch commands to sample synchronously with the second clock and the latch responding after a delay related to the difference between the second and third clocks and processing delays. The method may include controlling the latch, at least at times, to receive in sequence from the register a series of processor instruction contents from the program counter. It also may include disabling the register when conditions for execution of an instruction in the program counter have not been satisfied.

According to still another aspect, the invention involves a method for monitoring a processor having a program counter, when it executes software code for a computer program, comprising: non-invasively collecting information regarding instructions executed by the processor, from the program counter; and asynchronously from the operation of the processor, sampling the collected information. This method may further include providing the samples to a host computer via a shift register in a JTAG port; in turn, the host computer may be operated to provide a statistical record of instructions executed by the processor.

BRIEF DESCRIPTION OF THE DRAWINGS

The invention will be better understood from the detailed description below, which should be read in conjunction with the accompanying drawings. In the drawings, like reference designations are intended to refer to like elements. Items are not intended to be drawn to scale.

FIG. 2 is a diagrammatic illustration of the manner in which a sampler according to the invention operates a program counter capture register in the presence of conditional instructions in a program flow, so as to capture only instructions actually executed.

DETAILED DESCRIPTION

Figure 1:
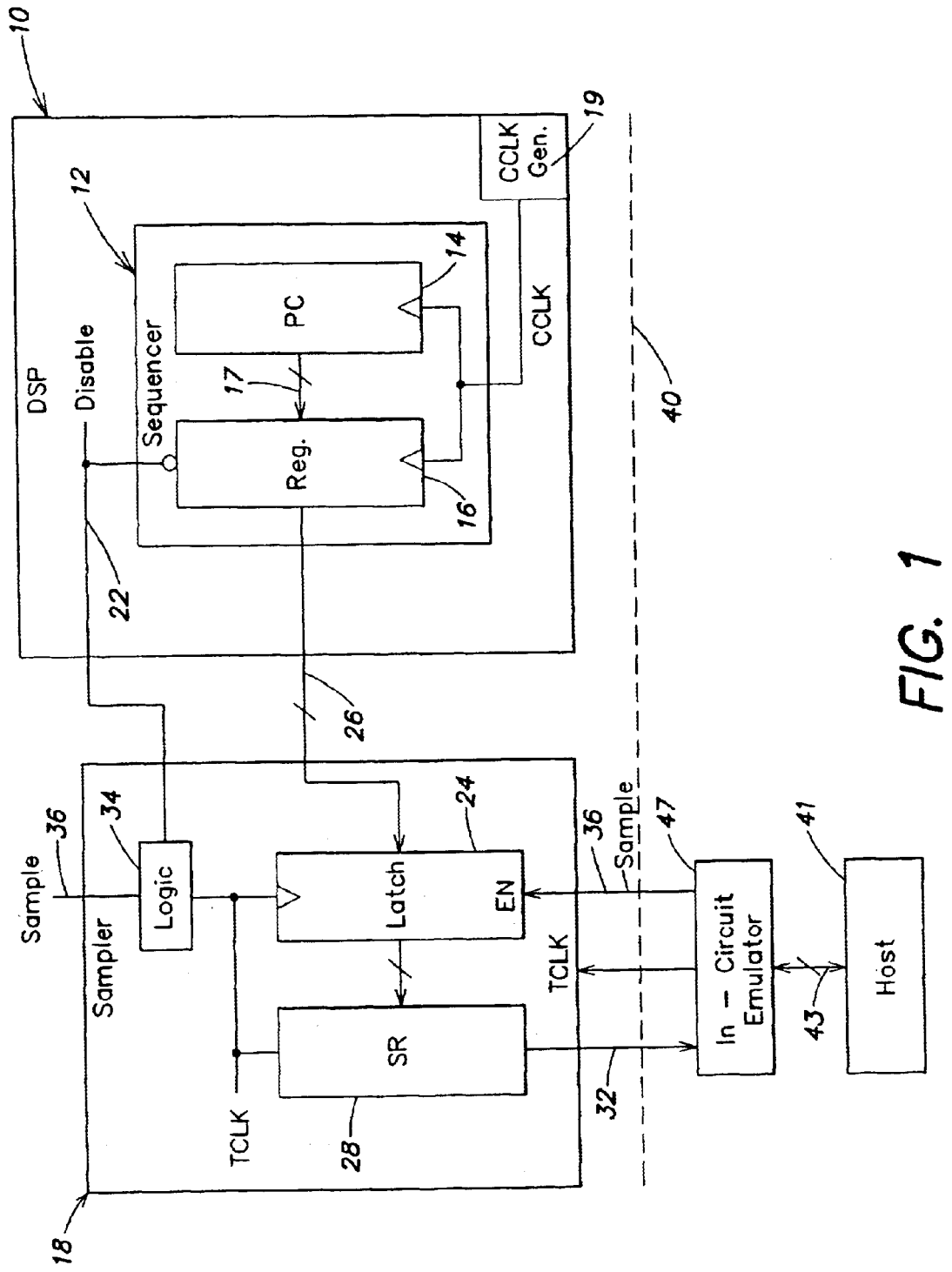
FIG. 1 is a block diagram of a system according to the invention, certain portions thereof being optional and not essential, as described herein.

As stated above, the operation of a programmed processor may be monitored and analyzed, to permit code optimization, by developing a statistical profile of the time occupied by the processor in executing the various routines and processes set forth in or implemented by the target program code. One way to develop this statistical profile is to randomly sample the processor to determine what instruction it is executing at the sampling time. That instruction may then be associated with its place in the program code and a timing profile developed. Conveniently, in most processors there is included a program counter (PC). The program counter is a register that contains the address (in memory) of the instruction being executed. The contents of this register are incremented automatically just before each instruction of a program is fetched from memory, to enable sequential execution of the stored instructions. Under program control, the contents of the PC also may be modified or exchanged with the contents of a pointer register to effect subroutine calls and program branches. A mechanism, commonly employed for other purposes, may be adapted to permit the statistical sampling of the program counter without creating significant overhead. This mechanism is the so-called JTAG register usually built into a processor chip. JTAG stands for Joint Test Action Group, a body of over 200 members in the electronics and semiconductor industries which, in 1985, met to establish and promote as an industry standard a solution to certain problems of board-level testing. The solution in 1990 became IEEE Std. 1149.1-1990, *IEEE Standard Test Access Port And Boundary-Scan Architecture*. Every JTAG (i.e., IEEE Std. 1149.1)—compatible device includes a register which allows test instructions and data to be serially loaded into the device and to enable the subsequent test results to be read out serially from the device. To be compatible with the standard, the component must have certain basic test features, but the standard allows designers to add test features to meet their own unique requirements.

Reference is now made to FIG. 1, which shows in block diagram form a processor such as a DSP 10 having a conventional sequencer 12 which includes a program counter (PC) 14: A register 16 collects the PC contents on each "tick" of the microprocessor's core clock and a sampler 18, connected to register 16, samples the contents of register 16 asynchronously from the operation of the processor's core clock.

More particularly, a register 16 receives in parallel on bus 17 the contents of program counter 14. On each tick of the microprocessor core clock (CCLK) from the clock generator 19, the PC contents are loaded into register 16 unless a DISABLE signal is asserted on line 22. The disable signal is asserted when the register 16 is to be read (see below), to prevent its contents changing until they are read, and for instructions which are aborted and not to be executed by the processor. Instructions to be aborted include those that are present in the program code but whose execution is conditional, when the condition allowing execution has not occurred.

Sampler 18 includes a first register or latch 24 which is connected to register 16 to receive its outputs in parallel on bus 26. Sampling latch 24 is clocked by a test clock (TCLK) which is separate from and operates independently of the microprocessor core clock CCLK. Latch 24 may be read in parallel by a shift register 28 and its contents serially shifted out on line 32. Shift register 28 may be the JTAG EMUPC shift register.

The TCLK signal not only clocks latch 24 to capture the contents of the register 16 which contains the program count, but also (through logic 34) generates a DISABLE signal on line 22 to disable register 16 when the PC is to be sampled, as denoted by the SAMPLE signal appearing on line 36. That it, when the SAMPLE signal is provided, a DISABLE signal is generated so as to stop register 16 from responding to the CCLK clock and assuring that the PC contents captured in register 16 do not change before they can be read. Logic 34, which may not be needed and should be considered a design detail within the skill in the art, is provided, if necessary, merely to resolve timing issues and assure that the profiling register 16 is disabled before it is sampled by latch 24; although logic 34 is shown as receiving as inputs the TCLK and SAMPLE signals, they should not be considered necessary inputs.

With reference to FIG. 2, the operation of the program counter capture register 16 will be better understood. Consider, as an example, a pipelined processor in which, for any given clock cycle, a first instruction is fetched, the immediately preceded fetched instruction is decoded, the next preceding instruction is evaluated and executed conditionally. Let us assume a sequence of six instructions, A–F. Instructions A–C are NOP (no operation) instructions, instruction D is a jump to A instruction, and instructions E and F are conditional instructions COND1 and COND2 for which we shall assume that their condition was not satisfied, so the instructions, when encountered, should not be executed. FIG. 2 shows the sequence of fetched instructions in the row labeled "Fetch," the sequence of decoded instructions in the row labeled "Decode," the sequence of instructions apparently to be executed in the row labeled "Execute," and the sequence of contents of register in the row labeled "Register 16" which results because instructions E and F are aborted, for each of a series of processor clock cycles. In this hypothetical example, it will thus be seen that 50% of the time the processor is expected to be executing instruction D. If statistically valid sampling of the profiling register 16 takes place, it should, indeed, be seen that instruction D is executing half the time. That would lead the designer to conclude that attention should be given to efficiently executing instruction D or to changing the program code so that another instruction, faster-executing code may be substituted for the original code.

The output from the JTAG EMUPC register 28 is not a sequence of each and every instruction executed by the processor. Rather, it is a sampling thereof, providing a serial bit stream of instructions that requires multiple clock cycles for each processor clock cycle.

The key to the validity of any body of statistical information is the number of samples collected. As the number of randomly collected samples increases, so does the accuracy of the information extracted from the samples. This indicates that it is desirable to assure that the debugger collects samples as fast as possible, while still keeping the sampling random. Preferably this is accomplished by collecting reasonable-sized "bursts" of samples (e.g., 32–64 samples) from the processor.

The apparatus below dashed line 40 in FIG. 1 may optionally be employed to allow burst sampling or otherwise to assure greater confidence in the randomness of the sampling operation. A host computer 41, such as a personal computer or workstation, issues a command on communication link or bus 43 (e.g., a PCI or ISA bus) to an in-circuit emulator (ICE) 47, the command being one which will cause the in-circuit emulator 47 to issue the SAMPLE signal on line 36. The in-circuit emulator is a conventional device or circuit which provides command and protocol translation between a host computer and a JTAG port. It also generates and supplies to the JTAG port a clock for use by the JTAG shift register and other port components, here labeled the TCLK clock. The host operates on its own internal clock, asynchronously to the TCLK clock used by the ICE and sampler 18. The TCLK clock of the sampler also is asynchronous of and independent with respect to the processor clock CCLK. There is thus an inherent and random delay (within a clock cycle interval) between assertion of the sampling command by the host system and the assertion of the SAMPLE signal.

The host may usefully call for sampling over an interval, wait an interval and then sample again for an interval, each of those intervals being one or more (not necessarily uniform in amount) processor clock cycles in duration.

Sampled program counter contents may be fed back to the host via the ICE and the host can run any conventional or custom statistical analysis software to calculate and/or display a distribution of program counts which were sampled. If desired, though not shown, each sample may be time-stamped to allow elapsed-time statistics to be developed, as well.

Thus will be seen that the invention provides an apparatus and method for monitoring and analyzing the execution of program instructions on a processor such as a digital signal processor without altering the dynamics of execution of the program, without slowing the system, and without requiring any changes to the program code at either the source or machine code level. Thus, there is no need to recompile or reassemble program code in order to analyze its performance. Neither is it necessary a priori to know where in a program it might be fruitful to insert breakpoints. The operation of the entire program is statistically monitored so no a priori assumptions are required. Instruction utilization is non-invasively tracked.

Accordingly, it will be appreciated that although certain embodiments of the invention have been shown, those embodiments are presented by way of example only, for illustration, and not for limitation. Those skilled in the art will readily conceive improvements and variations to the disclosed embodiments, as well as entirely new embodiments. Such alterations, modifications, enhancements and additional embodiments are intended to be within the spirit and scope of the invention and to be suggested hereby. For example, the host computer need not be a general purpose computer but may be a dedicated test system or other device of limited functionality, or a handheld programmable calculator, for example. Elements described as latches may be other suitable types of registers. Instructions may be sampled one at a time or in successions of multiple instructions in sequence. Sampling may be accomplished via a dedicated register or other register than the JTAG register. These are but a few of the variations on the theme of the invention that will occur to those skilled in the art and which are intended to be covered. Accordingly, the invention is intended to be limited only as required by the appended claims and equivalents thereto.

What is claimed is:

1. A system for monitoring a processor when it executes software code for a computer program, comprising:
    a register, operatively connected to the processor, that collects information regarding instructions executed by the processor; and
    a sampler, operatively connected to the register, that asynchronously from the operation of the processor statistically, samples contents of the register.

2. The system of claim 1 wherein the asynchronous sampling of the register by the sampler occurs with timing independently of instruction executed by the processor.

3. The system of claim 1 or claim 2 futher comprising a host computer receiving said samples and providing therefrom a statistical record of the instructions executed by the processor.

4. A system for monitoring a processor when it executes software code for a computer program, comprising:
    a register, operatively connected to the processor, that collects information regarding instructions executed by the processor;
    a sampler, operatively connected to the register, that asynchronously from the operation of the processor statsistically, samples contents of the register; and
    a host computer that issues commands to initiate operation of the sampler to sample the contents of the register.

5. The system of claim 4 wherein the asynchronous sampling of the register by the sampler occurs with timing independently of instruction executed by the processor.

6. The system of claim 3 or claim 5 futher comprising the host computer receiving said samples and providing therefrom a statistical record of the instructions executed by the processor.

7. A system for monitoring a processor when it executes software code for a computer program, the processor being clocked by a first clock and including a program counter also clocked by said first clock, comprising:
    a register operatively connected to the program counter and clocked by the first clock and receiving the contents of the program counter synchronously with the first clock except when disabled; and
    a latch operatively connected to the register statistically to sample the register contents in response to a second clock which is independent of the first clock.

8. The system of claim 7 further including logic which disables the register when conditions for execution of an instruction in the program counter have not been satisfied.

9. The system of claim 7 further including logic adapted to disable the register while it is being sampled by the latch.

10. The system of claim 5 or claim 9 further including a shift register operatively connected to receive the contents of the latch and communicate them to a user device.

11. The system of claim 10 further including:
    a host computer clocked by a third clock which is independent of the first clock and the second clock;
    an interface unit coupled between the host computer and the latch and arranged to communicate sampling commands from the host computer to the latch to initiate sampling by the latch.

12. The system of claim 11 wherein the interface unit issues to the latch commands to sample synchronously with the second clock.

13. The system of claim 10 wherein the latch is controlled at times to receive in sequence from the register a series of processor instruction contents from the program counter.

14. The system of claim 10 wherein the shift register is in a JTAG port.

15. A method for monitoring a processor when it executes software code for a computer program, comprising:
    in a register operatively connected to the processor, collecting information regarding instructions executed by the processor; and
    asynchronously from the operation of the processor statistically , sampling contents of the register.

16. The method of claim 15 wherein the act of sampling, asynchronously from the operation of the processor, occurs independently of execution of instructions by the processor.

17. The method of claim 15 or claim 16 further comprising operating a host computer to receive said samples and provide therefrom a statistical record of the instructions executed by the processor.

18. A method for monitoring a processor when it executes software code for a computer program, comprising:
    collecting, in a register operatively connected to the processor, information regarding instructions executed by the processor;
    statistically sampling, asynchronously from the operation of the processor, the contents of the register; and
    operating a host computer to issue commands to initiate operation of the sampler to sample the contents of the register.

19. The method of claim 18 wherein in the act of sampling, asynchronously from the operation of the processor, occurs independently of execution of instructions by the processor.

20. The method of claim 18 or claim 19 further comprising operating the host computer to receive said samples and provide therefrom a statistical record of the instructions executed by the processor.

21. A method for monitoring a processor when it executes software code for a computer program, the processor being clocked by a first clock and including a program counter also clocked by said first clock, comprising:

capturing the instruction contents of the program counter in a register, non-invasively, synchronously with the first clock, except not capturing the instruction contents for instructions which will not be executed; and statistically sampling the register contents in response to a second clock which is independent of the first clock.

22. The method of claim 21 further including controlling the latch, at least at times, to receive in sequence from the register a series of processor instruction contents from the program counter.

23. The method of claim 21 further including disabling the register when conditions for execution of an instruction in the program counter have not been satisfied.

24. The method of claim 21 further including disabling the register while it is being sampled.

25. The method of claim 21 or claim 24 wherein sampling includes delivering the program counter contents to a shift register operatively connected to receive the contents of the latch and communicate them to a user device.

26. The method of claim 25 wherein the shift register is in a JTAG port.

27. The method of claim 25 wherein the user device is a host computer and the host computer is operated to generate a statistical analysis of the captured program counter instruction contents.

28. The method of claim 25 further including clocking the host computer by a third clock which is independent of the first clock and the second clock; and using an interface unit coupled between the host computer and the latch, communicating sampling commands from the host computer to the latch to initiate sampling by the latch.

29. The method of claim 28 wherein the interface unit issues to the latch commands to sample synchronously with the second clock.

30. A method for monitoring a processor having a program counter, when it executes software code for a computer program, comprising:

non-invasively collecting information regarding instructions executed by the processor, from the program counter; and asynchronously from the operation of the processor, statistically sampling the collected information.

31. The method of claim 30 further including providing the samples to a host computer via a shift register in a JTAG port.

32. The method of claim 31 further including the host computer providing a statistical record of instructions executed by the processor.

* * * * *